US012778010B2

(12) United States Patent
Clark et al.

(10) Patent No.: US 12,778,010 B2
(45) Date of Patent: Nov. 3, 2026

(54) CUTTING HEAD HARVESTING LOSS DETECTION AND IMPROVEMENT SYSTEM AND METHOD

(71) Applicant: DEERE & COMPANY, Moline, IL (US)

(72) Inventors: Scott N. Clark, Bettendorf, IA (US); Rana Shakti Singh, Ramgarh (IN); Mehul Pankajkumar Bhavsar, Pune (IN)

(73) Assignee: Deere & Company, Moline, IL (US)

( * ) Notice: Subject to any disclaimer, the term of this patent is extended or adjusted under 35 U.S.C. 154(b) by 393 days.

(21) Appl. No.: 18/584,355

(22) Filed: Feb. 22, 2024

(65) Prior Publication Data

US 2025/0268139 A1 Aug. 28, 2025

(51) Int. Cl.

| | |
|---|---|
| ***A01D 41/00*** | (2006.01) |
| ***A01D 41/127*** | (2006.01) |
| ***A01D 41/14*** | (2006.01) |
| ***G06V 10/143*** | (2022.01) |
| ***G06V 10/60*** | (2022.01) |
| ***G06V 10/74*** | (2022.01) |
| ***G06V 20/10*** | (2022.01) |
| ***G06V 20/56*** | (2022.01) |

(52) U.S. Cl.
CPC ......... *A01D 41/141* (2013.01); *A01D 41/127* (2013.01); *G06V 10/143* (2022.01); *G06V 10/60* (2022.01); *G06V 10/74* (2022.01); *G06V 20/188* (2022.01); *G06V 20/56* (2022.01)

(58) Field of Classification Search
None
See application file for complete search history.

(56) References Cited

U.S. PATENT DOCUMENTS 6,591,145 B1 7/2003 Hoskinson et al.
7,721,515 B2 5/2010 Pollklas et al.
8,469,784 B1 * 6/2013 Hoskinson ........... A01D 41/127 460/4
9,050,890 B2 6/2015 Buerkle et al.
9,740,208 B2 8/2017 Sugumaran et al.
9,807,933 B2 11/2017 Boyd et al.
(Continued)

FOREIGN PATENT DOCUMENTS

CN 113287422 A 8/2021
DE 102015224175 B3 4/2017
(Continued)

*Primary Examiner* — Jonathan M Dager
(74) *Attorney, Agent, or Firm* — Taft Stettinius & Hollister LLP; Stephen F. Rost

(57) ABSTRACT

An agricultural machine for reducing cutting head harvesting loss includes: ground engaging mechanisms such as wheels or tracks, a cutting head for harvesting crop, an image sensor configured to capture one or more images of a field of view, a light emitting device configured to emit light into the field of view, and a controller operatively coupled to at least the image sensor. The controller is configured to: receive data corresponding to one or more images of the field of view from the at least one image sensor, determine one or more reflectance values based on the received data corresponding to the one or more images, and determine an amount of grain shown in the one or more images of the field of view based on the one or more determined reflectance values.

18 Claims, 8 Drawing Sheets

(56) References Cited

U.S. PATENT DOCUMENTS

| | | | | |
|---|---|---|---|---|
| 9,829,883 | B1 | 11/2017 | Lavoie et al. | |
| 10,049,296 | B2 | 8/2018 | Walker | |
| 10,255,670 | B1 * | 4/2019 | Wu | H04N 7/183 |
| 10,377,197 | B2 | 8/2019 | Fukatsu et al. | |
| 10,721,859 | B2 | 7/2020 | Wu et al. | |
| 10,754,353 | B2 | 8/2020 | Sporrer et al. | |
| 10,761,544 | B2 | 9/2020 | Anderson et al. | |
| 10,820,504 | B2 * | 11/2020 | Borsdorf | A01D 41/1271 |
| 11,112,262 | B2 | 9/2021 | Anderson | |
| 11,308,735 | B2 | 4/2022 | Wagner et al. | |
| 11,324,164 | B2 | 5/2022 | Sorensen | |
| 11,470,776 | B2 | 10/2022 | Barther et al. | |
| 11,483,972 | B2 * | 11/2022 | Dima | A01B 63/008 |
| 11,499,295 | B2 | 11/2022 | Anderson | |
| 11,641,801 | B2 * | 5/2023 | Sidon | A01B 76/00 701/50 |
| 11,758,844 | B2 * | 9/2023 | White | A01D 41/127 701/50 |
| 11,805,734 | B2 | 11/2023 | Li et al. | |
| 11,980,135 | B2 * | 5/2024 | Kraus | A01D 91/04 |
| 12,284,944 | B2 * | 4/2025 | Baumgarten | A01D 41/127 |
| 2005/0150202 | A1 * | 7/2005 | Quick | A01D 41/127 460/1 |
| 2006/0020402 | A1 | 1/2006 | Bischoff et al. | |
| 2008/0137087 | A1 * | 6/2008 | Greten | G01N 21/276 702/81 |
| 2018/0053067 | A1 * | 2/2018 | Walker | A01D 41/1273 |
| 2019/0150357 | A1 * | 5/2019 | Wu | H04N 23/51 |
| 2019/0227554 | A1 | 7/2019 | Cantrell et al. | |
| 2020/0264154 | A1 | 8/2020 | Saez et al. | |
| 2020/0337235 | A1 * | 10/2020 | Blank | A01M 21/043 |
| 2021/0088691 | A1 * | 3/2021 | Ferren | A01D 41/1273 |
| 2021/0357664 | A1 | 11/2021 | Kocer et al. | |
| 2022/0232770 | A1 * | 7/2022 | Yanke | A01D 41/141 |
| 2022/0348322 | A1 | 11/2022 | Zemenchik | |
| 2023/0000015 | A1 * | 1/2023 | Herrmann | A01D 41/127 |
| 2023/0292665 | A1 * | 9/2023 | Vandike | A01D 41/06 56/10.2 A |
| 2023/0345873 | A1 | 11/2023 | Goossens et al. | |
| 2024/0357968 | A1 * | 10/2024 | Hunt, II | A01D 41/127 |
| 2025/0143283 | A1 * | 5/2025 | Hunt | G01S 13/867 |

FOREIGN PATENT DOCUMENTS

| | | | |
|---|---|---|---|
| DE | 102016202628 | A1 | 8/2017 |
| EP | 2545761 | A1 | 1/2013 |
| EP | 2681984 | B1 | 1/2016 |
| EP | 3401854 | A1 | 11/2018 |
| EP | 3284334 | B1 | 4/2019 |
| EP | 3552474 | B1 | 8/2021 |
| JP | 2021058099 | A | 4/2021 |
| WO | 2023021005 | A1 | 2/2023 |
| WO | 23047240 | A1 | 3/2023 |
| WO | 2023187494 | A | 10/2023 |

* cited by examiner

CUTTING HEAD HARVESTING LOSS DETECTION AND IMPROVEMENT SYSTEM AND METHOD

FIELD OF THE DISCLOSURE

The present description relates to agricultural machines and, in particular, to systems and methods for reducing harvesting loss of agricultural machines.

BACKGROUND OF THE DISCLOSURE

There are a variety of different types of agricultural machines. Some agricultural machines include combine harvesters, sugar cane harvesters, cotton harvesters, self-propelled forage harvesters, produce harvesters, and windrowers. During harvesting operations, agricultural machines may have harvesting losses. Accurately detecting, categorizing, and reducing harvesting losses may be beneficial for various applications.

SUMMARY

In an illustrative implementation, an agricultural machine for reducing cutting head harvesting loss comprises: ground engaging mechanisms configured to support a chassis and rotate during movement of the agricultural machine; a cutting head positioned forward of the ground engaging mechanisms and configured to harvest crop in a worksite; at least one image sensor configured to capture one or more images of a field of view, the field of view being external to the agricultural machine; at least one light emitting device configured to emit light in the field of view; a controller configured to: receive data corresponding to one or more images of the field of view from the at least one image sensor; determine one or more reflectance values based on the received data corresponding to the one or more images, each reflectance value being associated with a portion of an image of the one or more images; and determine an amount of grain shown in the one or more images of the field of view based on the one or more determined reflectance values.

In some implementations, the at least one light emitting device is configured to emit light from a plurality of locations into the field of view. In some implementations, the at least one light emitting device is configured to emit light into the field of view in a plurality of ranges of wavelengths of visible light; and each range of wavelengths of visible light of the plurality of ranges of wavelengths of visible light is associated with a specific color of visible light.

In some implementations, the controller is configured to compare the data corresponding to the one or more captured images to data corresponding to one or more additional images including grain of a crop type associated with the worksite; and the controller is configured to determine the amount of grain shown in the one or more images of the field of view further based on comparison between the data corresponding to the one or more captured images and the data corresponding to the one or more additional images.

In some implementations, the controller is configured to cause the at least one light emitting device to emit light into the field of view in a plurality of ranges of wavelengths. In some implementations, the controller is configured to: receive data corresponding to one or more images of the field of view from the at least one image sensor for each range of wavelengths of the plurality of ranges of wavelengths; determine, for each range, one or more reflectance values based on the received data corresponding to the one or more images, each reflectance value being associated with a portion of an image of the one or more images; and determine, for each range, an amount of grain shown in the one or more images of the field of view based on the one or more determined reflectance values. In some implementations, the controller causes the at least one light emitting device to emit light into the field of view in the range of wavelengths associated with the greatest amount of grain determined, by the controller, to be shown in the one or more images.

In some implementations associated with calibration of a light emission variable, the controller is configured to compare the data corresponding to the one or more captured images to data corresponding to one or more additional images including grain of a crop type associated with the worksite; and the controller is configured to determine the amount of grain shown in the one or more images of the field of view further based on comparison between the data corresponding to the one or more captured images and the data corresponding to the one or more additional images.

In some implementations, the controller is configured to determine a desired range of wavelengths from the plurality of ranges of wavelengths based on at least one of the following environmental characteristics of the worksite: a wind characteristic, a sunlight characteristic, and a soil characteristic; and the controller is configured to cause the at least one light emitting device to emit light into the field of view at the desired range of wavelengths. In some implementations, the controller is configured to determine a desired range of wavelengths from the plurality of ranges of wavelengths based on at least one crop characteristic of the crop in the worksite; and the controller is configured to cause the at least one light emitting device to emit light into the field of view at the desired range of wavelengths.

In some implementations, the controller is configured to cause adjustment of an operational characteristic of the agricultural machine based on the amount of grain determined to be shown in the one or more images of the field of view. In some implementations, the controller is configured to: receive an indication of a pre-harvest grain loss; and generate a cutting head harvesting loss map, which indicates grain loss that has occurred during the harvesting operation and one or more corresponding locations in the worksite where the grain loss has occurred during the harvesting operation, based on the indication of pre-harvest grain loss and based on the amount of grain determined to be shown in the one or more images of the field of view. In some implementations, the controller is configured to: receive an indication of a pre-harvest grain loss; and cause an indication of grain loss associated with the cutting head to be displayed based on the indication of pre-harvest grain loss and based on the amount of grain determined to be shown in the one or more images of the field of view.

In some implementations, the controller is configured to cause the at least one light emitting device to emit light into the field of view at a plurality of intensities. In some implementations, the agricultural machine further comprises at least one light filter configured to filter the emitted light captured by the at least one image sensor.

In another illustrative implementation, a method for reducing cutting head harvesting loss of an agricultural machine configured to harvest crop in a worksite comprises: capturing one or more images of a field of view that is external to the agricultural machine; emitting light into the field of view with at least one light emitting device; receiving, via a controller, data corresponding to one or more images of the field of view; determining, via the controller, one or more reflectance values based on the received data corresponding to the one or more images, each reflectance value being associated with a portion of an image of the one or more images; and determining, via the controller, an amount of grain shown in the one or more images of the field of view based on the one or more determined reflectance values.

In some implementations, the method further comprises comparing, via the controller, the data corresponding to the one or more captured images to data corresponding to one or more additional images including grain of a crop type associated with the worksite; and determining, via the controller, the amount of grain shown in the one or more images of the field of view further based on comparison between the data corresponding to the one or more captured images and the data corresponding to the one or more additional images.

In another illustrative implementation, a method of reducing cutting head harvesting loss of an agricultural machine configured to harvest crop in a worksite comprises: capturing one or more images of a field of view that is external to the agricultural machine; emitting light into the field of view with at least one light emitting device in a first range of wavelengths and a second range of wavelengths; receiving, via a controller, data corresponding to one or more images of the field of view from the at least one image sensor for the first range of wavelengths and the second range of wavelengths; determining, via the controller, for each of the first and second ranges of wavelengths, one or more reflectance values based on the received data corresponding to the one or more images, each reflectance value being associated with a portion of an image of the one or more images; determining, via the controller, for each of the first and second ranges of wavelengths, an amount of grain shown in the one or more images of the field of view based on the one or more determined reflectance values.

In some implementations, the method further comprises: emitting light into the field of view in the first or second range of wavelengths based on which of the first or second range of wavelengths is associated with the greatest amount of grain determined, by the controller, to be shown in the one or more images. In some implementations, the method further comprises: comparing, via the controller, the data corresponding to the one or more captured images to data corresponding to one or more additional images including grain of a crop type associated with the worksite; and determining, via the controller, the amount of grain shown in the one or more images of the field of view further based on comparison between the data corresponding to the one or more captured images and the data corresponding to the one or more additional images.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

The implementations of the present disclosure described below are not intended to be exhaustive or to limit the disclosure to the precise forms in the following detailed description. Rather, the implementations are chosen and described so that others skilled in the art may appreciate and understand the principles and practices of the present disclosure.

Figure 1:
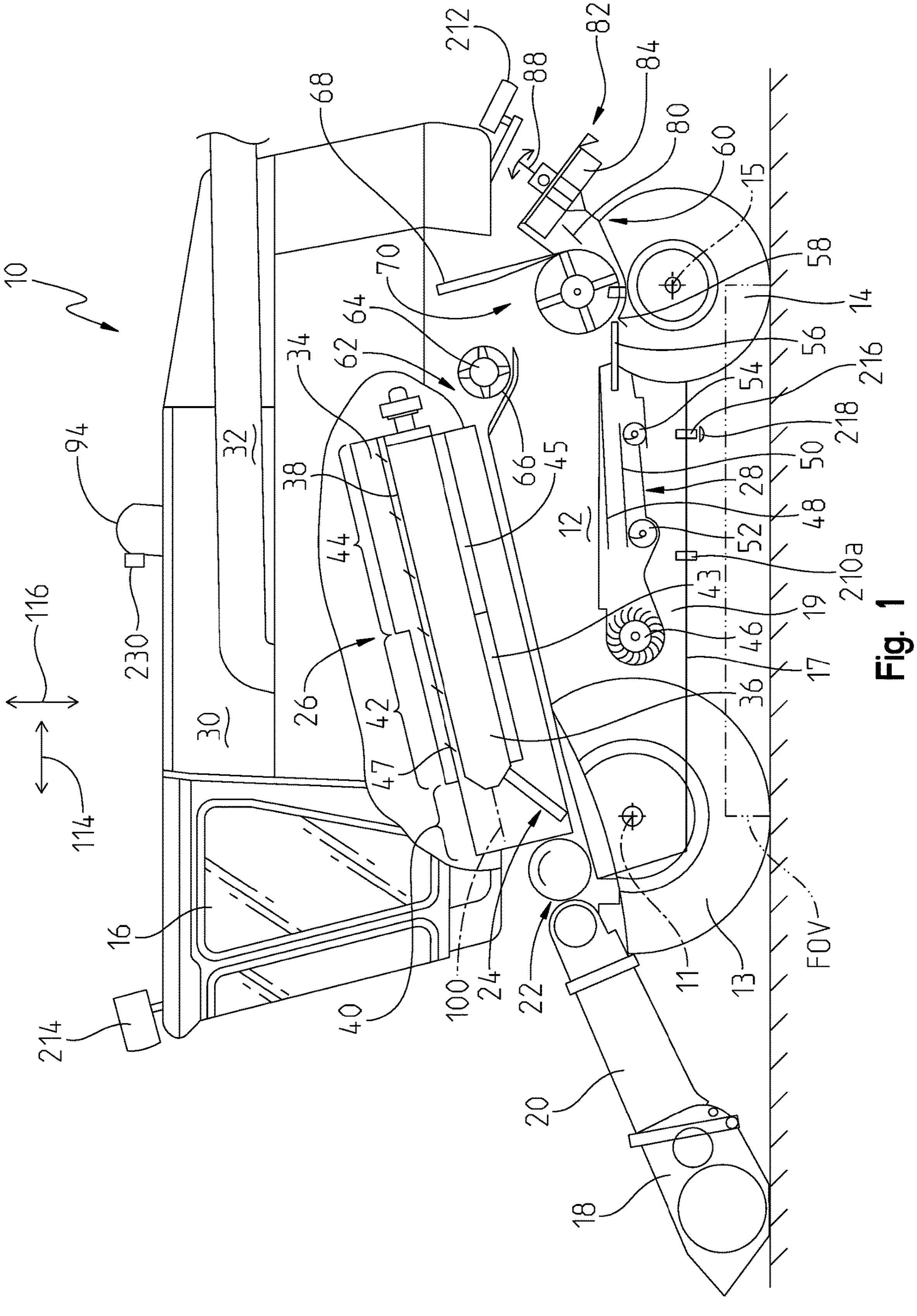
FIG. 1 is a side view of an example agricultural machine configured to harvest and process crop in a worksite.

In FIG. 1, an implementation of an agricultural machine 10 is shown. The agricultural machine 10 includes a chassis 12, one or more of front ground engaging mechanisms 13, and one or more of rear ground engaging mechanisms 14. The front and rear ground engaging mechanisms 13, 14 may be wheels or tracks that are in contact with an underlying ground surface and support the chassis 12 above the ground. In the illustrative implementation, the front ground engaging mechanisms 13 are coupled to a front axle 11 that extends laterally, and the rear ground engaging mechanisms 14 are coupled to a rear axle 15 that extends laterally. The front and rear axles 11, 15 each have respective centerlines, which, in the illustrative implementation, are defined as the axial midpoints of thereof, where the axial direction is shown by the double-headed arrow 114 in FIG. 1. In the illustrative implementation, the axial direction and the lateral direction are perpendicular to one another. As shown in FIG. 1, the double headed arrow 116 represents the vertical direction, which in the illustrative implementation, is perpendicular to the axial and lateral directions.

In the illustrative implementation, the ground engaging mechanisms 13, 14 are coupled to the chassis 12 and are configured to rotate to move the agricultural machine 10 in a forward operating direction (which is to the left in FIG. 1) and in other directions. In some implementations, operation of the agricultural machine 10 is controlled from an operator's cab 16. The operator's cab 16 may include any number of controls for controlling the operation of the agricultural machine 10, such as a user interface 220. In some implementations, operation of the agricultural machine 10 may be conducted by a human operator in the operator's cab 16, a remote human operator, or an automated system.

Figure 2A:
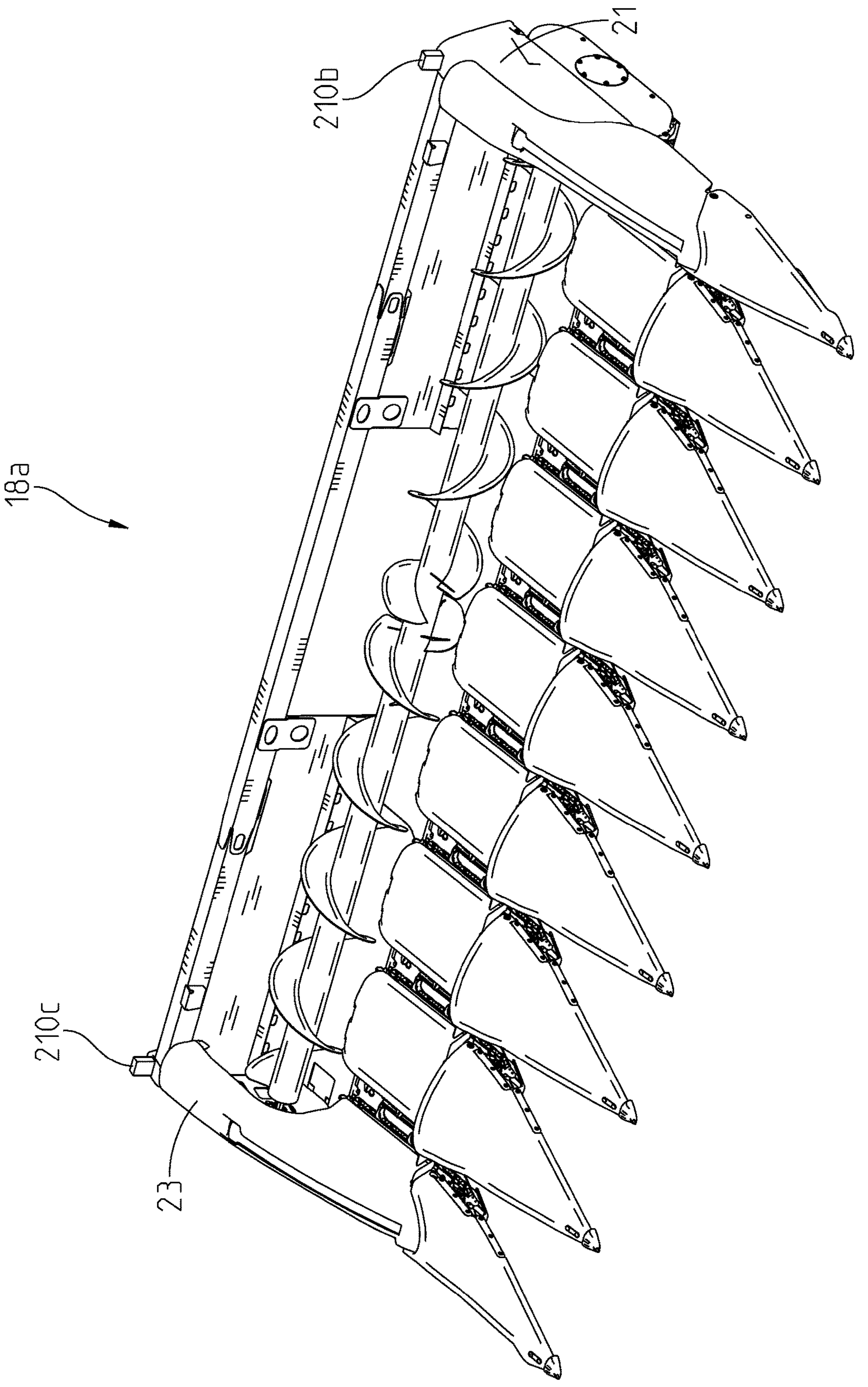
FIG. 2*a* is a perspective view of an example cutting head for the agricultural machine.
Figure 2B:
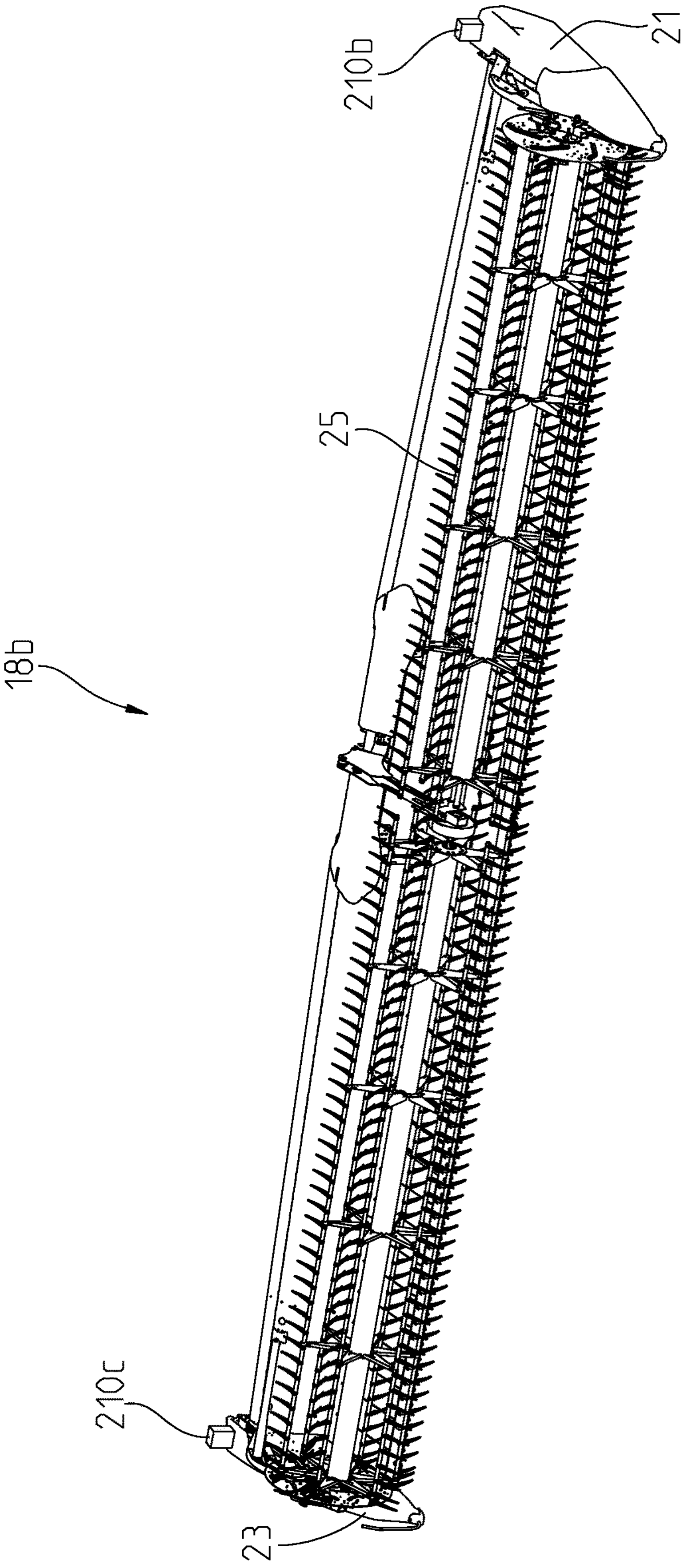
FIG. 2*b* is a perspective view of another example cutting head for the agricultural machine.

A cutting head 18 is disposed at a forward end of the agricultural machine 10 and is configured to harvest crop and to conduct harvested crop to a slope conveyor 20. The term harvested crop as used herein includes grain (e.g., corn, wheat, soybeans, rice, oats) and material other than grain (MOG). The cutting head 18 may be a draper, a belt pick-up assembly, a corn head as shown in FIG. 2*a*, a cutting platform with a reel assembly as shown in FIG. 2*b*, or any other cutting head configured to harvest crop in a worksite. Upon receiving the harvested crop from the cutting head 18, the slope conveyor 20 conducts the harvested crop to a guide drum 22. The guide drum 22 guides the harvested crop to an inlet 24 of a threshing assembly 26, as shown in FIG. 1. In the illustrative implementation, various sub-systems of the agricultural machine 10, such as the threshing assembly, a clean crop routing assembly 28, a crop debris routing assembly 60, and a residue assembly 82, cooperate to process the harvested crop.

The threshing assembly 26 includes a housing 34 and one or more threshing rotors. A single threshing rotor 36 is shown in FIG. 1. The threshing rotor 36 includes a drum 38 arranged along a threshing axis 100, and the threshing rotor 36 rotates about the threshing axis 100. The threshing assembly 26 further includes a charging section 40, a threshing section 42, and a separating section 44. The charging section 40 is arranged at a front end of the threshing assembly 26, the separating section 44 is arranged at a rear end of the threshing assembly 26, and the threshing section 42 is arranged between the charging section 40 and the separating section 44. The threshing assembly 26 further includes a thresher basket 43 that is positioned in the threshing section 42 and below the threshing rotor 36, guide vanes 47 that are positioned above the threshing rotor 36, and a separating grate 45 that is positioned in the separating section 44 and below the threshing rotor 36. In the illustrative implementation, the guide vanes 47 guide harvested crop rearwardly through the threshing assembly 26, and the harvested crop is separated and expands as it engages with the guide vanes 47. Harvested crop falls through the thresher basket 43 and through the separating grate 45.

The harvested crop may be directed to the clean crop routing assembly 28 with a blower 46 and sieves 48, 50 with louvers. The sieves 48, 50 can be oscillated axially. The clean crop routing assembly 28 removes MOG and guides grain over a screw conveyor 52 to a grain elevator 94. The grain elevator 94 deposits the grain in a grain tank 30, as shown in FIG. 1. The agricultural machine 10 includes a sensor 230 that is, for example, positioned on the grain elevator 94 and configured to measure a grain yield of the harvested crop. In the illustrative implementation, the yield sensor 230 measures the force of the grain contacting the sensor 230 to determine the yield. The grain in the grain tank 30 can be unloaded by means of an unloading screw conveyor 32 to a grain wagon, trailer, or truck, for example.

Harvested crop remaining at a rear end of the sieve 50 is again transported to the threshing assembly 26 by a screw conveyor 54 where the harvested crop is reprocessed by the threshing assembly 26. Harvested crop remaining at a rear end of the sieve 48 is conveyed by an oscillating sheet conveyor 56 to a lower inlet 58 of a crop debris routing assembly 60. Harvested crop at the threshing assembly 26 is processed by the separating section 44 resulting in straw being separated from other material of the harvested crop. The straw is ejected through an outlet 62 of the threshing assembly 26 and conducted to an ejection drum 64. The ejection drum 64 interacts with a sheet 66 arranged underneath the ejection drum 64 to move the straw rearwardly. A wall 68 is located to the rear of the ejection drum 64 and guides the straw into an upper inlet 70 of the crop debris routing assembly 60. In the crop debris routing assembly 60, blades of a rotatable chopper interact with knives to chop the straw into smaller harvested crop residue.

Harvested crop residue moves from the crop debris routing assembly 60 to the residue assembly 82 for optional subsequent processing and ejection from the agricultural machine 10. For example, as shown in FIG. 1, the residue assembly includes one or more spreaders provided downstream of an outlet 80 of the crop debris routing assembly 60. One spreader 84 is shown in FIG. 1. Rotation of blades of the spreader 84 about an axis 88 spreads the chopped straw as the chopped straw exits the agricultural machine 10. The agricultural machine 10 includes a sensor 212, such as a camera, that is positioned at the rear end of the agricultural machine 10 and configured capture one or more images of an additional field of view that includes, for example, chopped straw output from the agricultural machine 10 via the residue assembly 82. It should be appreciated that in some implementations, the additional field of view associated with the sensor 212 is separate from the field of view (e.g., FOV) associated with the at least one sensor 210, which will be described below.

It should be appreciated that while an exemplary agricultural machine 10 is described with reference to FIG. 1, aspects of the disclosure (e.g., the control system and methods herein) are applicable to various agricultural machines configured to harvest crop.

In some implementations, the agricultural machine 10 includes at least one image sensor 210 configured to capture one or more images of a field of view external to the agricultural machine 10. In FIG. 1, the at least one image sensor 210 is embodied as a camera. It should be appreciated that in some implementations, the at least one image sensor 210 may be embodied as one or more cameras (e.g., optical or visual radiation cameras or red, green, blue (RGB) cameras), LiDAR sensors, radar sensors (e.g., long-range terahertz radar, mm wave radar, ultra wideband radar, frequency-modulated continuous wave radar (FMCW), ground penetrating radar), ultrasonic sensors, thermal sensors (e.g., a thermal cameras), stereo cameras, laser vibrometers, infrared nuclear magnetic resonance (NMR) cameras, infrared short-wave infrared (SWIR) cameras, infrared terahertz sensors, or other sensors operable to capture or generate one or more images or data corresponding to the one or more images of the field of view.

In FIG. 1, an exemplary field of view is depicted as FOV. In the illustrative implementation, the one or more images of the field of view are one or more images of portions of the worksite, which may include depictions of crop of the type planted in the worksite during the present agricultural cycle (e.g., grain and MOG), crops of other types, soil, debris, and any other material in the worksite. If grain is depicted in the images of the field of view, it may be an indication of harvesting loss (i.e., grain loss during harvesting), pre-harvest loss (i.e., grain loss prior to harvesting), or both. Thus, in some implementations, it is advantageous to locate the field of view at one or more desired locations relative to the agricultural machine 10 to ensure that images of the field of view are indicative of harvesting loss, not pre-harvest loss. Further, in some implementations, it is advantageous to locate the field of view at one or more desired locations relative to particular components of the agricultural machine 10 to ensure that images of the field of view are indicative of harvesting loss associated with the desired components of the agricultural machine 10, not other components of the agricultural machine 10. Specifically, in some implementations, it is desirable to determine the harvesting loss that is associated with the cutting head 18—as opposed to harvesting loss associated with components of the agricultural machine downstream of the cutting head 18. Further still, in some implementations, it is advantageous to limit the field of view to a specific area to prevent ambient light from reaching the field of view, as ambient light can obscure the images captured by the at least one sensor 210.

For at least these reasons, in some implementations, the field of view includes an area rearward of the centerline of the front axle 11. In some implementations, the field of view is limited to areas rearward of the centerline of the front axle 11. In some implementations, the field of view includes an area forward of the center line of the rear axle 15. In some implementations, the field of view is limited to areas forward of the center line of rear axle 15.

In some implementations, the field of view includes an area underneath a portion of the chassis 12, where the term underneath means vertically below and aligned with axially and laterally. In some implementations, as shown in FIG. 1, the at least one image sensor 210 comprises an image sensor 210*a* located underneath at least one of the threshing assembly 26 and the clean crop routing assembly 28. In some implementations, the field of view is defined to exclude an area underneath the cutting head 18. In some implementations, the field of view is defined to exclude area forward of crop cutting devices (e.g., cutting knives) of the cutting head 18, which, in some implementations, are positioned at a forward end of the cutting head 18. In some implementations, the field of view is defined to exclude an area underneath or otherwise axially aligned with the slope conveyor 20, the cutting head 18, or both. In some implementations, the field of view is defined to exclude an area underneath or otherwise axially aligned with the residue assembly 82. In some implementations, the field of view is defined to exclude any area configured to receive harvested crop (e.g., straw) output by the residue assembly 82.

In some implementations, the at least one image sensor 210*a* is directed vertically downward (i.e., toward the ground) and laterally inward (i.e., toward a lateral midpoint of the agricultural machine 10) to define the field of view. In the illustrative implementation shown in FIG. 1, the agricultural machine 10 includes side walls 19, which are illustrated as transparent to show components of the agricultural machine that are laterally adjacent to the side walls 19. In the illustrative implementation, the side walls 19 terminate at a lower edge 17. It should be appreciated that the threshing assembly 26 and the clean crop routing assembly 28 are positioned laterally between opposite side walls 19 of the agricultural machine 10. As shown in FIG. 1, in some implementations, the at least one image sensor 210*a* is coupled to one or more of the side walls 19. While in FIG. 1, the at least one image sensor 210*a* is positioned at the lower edge 17, in some implementations, the at least one image sensor 210*a* may be recessed and positioned above the lower edge 17.

Referring still to FIG. 1, in the illustrative implementation, the agricultural machine 10 includes a sensor 214, such as a camera, positioned on a forward portion of the agricultural machine 10 and configured to capture images associated with an additional field of view, separate from the field of view (e.g., FOV) associated with the at least one sensor 210. For example, because the sensor 214 is directed to an area forward of the agricultural machine 10, the sensor 214 is configured to capture images associated with the additional field of view that depicts pre-harvest loss. By contrast, the placement and orientation of the at least one sensor 210*a* of FIG. 1 ensures that the one or more images of the field of view (e.g., FOV) captured by the at least one sensor 210*a* exclude any harvesting loss not associated with the cutting head 18 (e.g., exclusion of pre-harvest loss).

Referring now to FIGS. 2*a* and 2*b* examples of the cutting head 18 are shown. In FIG. 2*a*, the cutting head 18 is embodied as a corn head 18*a*, and in FIG. 2*b*, the cutting head 18 is embodied as an cutting platform 18*b* with a reel assembly 25. It should be appreciated that the disclosure is applicable to a draper, a belt pickup, or any other cutting head for harvesting crop in a worksite. In the illustrative implementations, each cutting head 18*a*, 18*b* extends laterally from a first end 21 to a second end 23, and the at least one image sensor 210 comprises a first sensor 210*b* located on the first end 21 and a second sensor 210*c* located on the second end 23 of the cutting head 18*a*, 18*b*. In the illustrative implementations shown in FIGS. 2*a*, 2*b*, the image sensors 210*b*, 210*c* are directed laterally inward toward the field of view. In the illustrative implementation, the field of view includes an area forward of the centerline of the front wheel axle 11, such as an area axially aligned with the cutting head 18, an area axially aligned with the slope conveyor 20, or both. In contrast, in implementations associated with the at least one image sensor 210*a* of FIG. 1, the field of view (e.g., FOV) may exclude any area axially aligned with the cutting head 18, axially aligned the slope conveyor 20, or both, for example, to ensure that images from the field of view captured by the at least one image sensor 210*c* exclude harvesting loss that is not associated with the cutting head 18 (e.g., exclusion of pre-harvest loss).

In some implementations in which the at least one image sensor 210 comprises a first sensor 210*b* located on the first end 21 and a second sensor 210*c* located on the second end 23 of the cutting head 18*a*, 18*b*, the image sensors 210*b*, 210*c* are directed laterally inward toward a field of view that includes an area rearward of the centerline of the front axle 11. In some implementations in which the at least one image sensor 210 comprises a first sensor 210*b* located on the first end 21 and a second sensor 210*c* located on the second end 23 of the cutting head 18*a*, 18*b*, the image sensors 210*b*, 210*c* are directed laterally inward toward a field of view that is limited to an area rearward of the centerline of the front axle 11.

Referring again to FIG. 1, in the illustrative implementation, the agricultural machine 10 includes at least one light emitting device 216 configured to emit light into the field of view. In the illustrative implementation, the at least one light emitting device 216 comprises at least one of: one or more lasers (e.g. infrared lasers, ultraviolet lasers, x-ray lasers, gamma-ray lasers, or any other laser configured to emit light into the field of view); one or more light emitting diodes (LEDs) (e.g., single-color LEDs, white LEDs, RGB LEDs, phosphor-based LEDs, mixed white LEDs, other white LEDs, Perovskite light-emitting diodes (PeLEDs) or any other LED array of any type configured to emit light into the field of view; one or more incandescent bulbs, halogen bulbs, or compact fluorescent lamps; or any other type of light emitter configured to emit light into the field of view. The at least one light emitting device 216 may be coupled to the chassis 12, the side walls 19, or positioned elsewhere on the agricultural machine 10 and directed toward the field of view. In some implementations, the at least one light emitting device 216 includes multiple light sources spaced apart from each other such that the at least one light emitting device 216 is configured to emit light from a plurality of locations into the field of view. In some implementations, the at least one light emitting device 216 is configured to emit light in a plurality of ranges of wavelengths. Each range includes one or more wavelengths of light. In some implementations, one or more ranges of wavelengths of the plurality of ranges of wavelengths are associated with one or more specific colors of visible light (e.g., red, orange, yellow, green, blue, violet). In some implementations, the at least one light emitting device 216 is configured to emit white light. In some implementations, the at least one light emitting device 216 is configured to emit light in a plurality of intensities.

In some implementations, the agricultural machine 10 includes at least one light filter configured to filter the emitted light captured by the at least one image sensor 210. In some implementations, the at least one light filter of the agricultural machine 10 is at least one polarizer 218 configured to filter light being received by the at least one image sensor 210 into one or more beams of light with adjusted (e.g., increased) polarization. In the illustrative implementation, the at least one polarizer 218 is embodied as at least one of: one or more linear polarizers (e.g., absorptive polarizers, beam-splitter polarizers) and one or more circular polarizers. In an illustrative implementation, the at least one polarizer may be embodied as a fiber polarization controller (e.g., coiled fiber or squeezed fiber). In some implementations, as shown in FIG. 1, the at least one light filter (e.g., the at least one polarizer 218) may be coupled to or otherwise positioned adjacent to the at least one light emitting device 216 (e.g. in the path of the emitted light) to polarize the wavelengths of light emitted by the at least one light emitting device 216. In some implementations, as shown in FIG. 1, the at least one light filter (e.g., the at least one polarizer 218) may be coupled to or otherwise positioned adjacent to the at least one image sensor 210 (e.g. in the path of the received light) to filter the light being received by the at least one image sensor 210.

Figure 3:
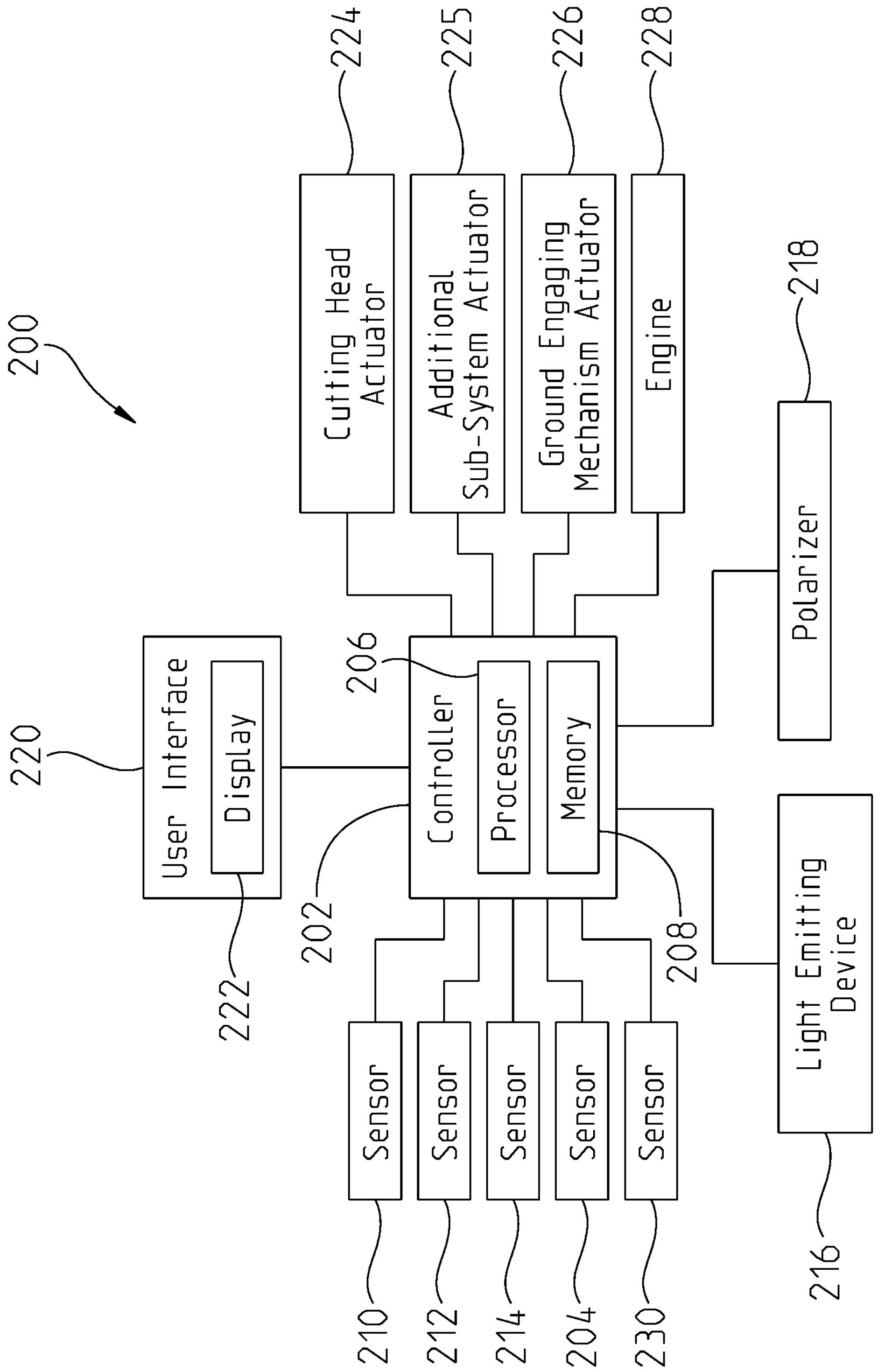
FIG. 3 is a diagrammatic view of an example control system for the agricultural machine configured to measure and analyze data associated with harvested crop in the worksite and cause adjustments to operational characteristics of the agricultural machine based on the measured and analyzed data.

Referring now to FIG. 3, an example control system 200 is shown. The control system 200 includes one or more memories 208 included in or accessible by the controller 202 and one or more processors 206 included in or accessible by the controller 202. The one or more processors 206 are configured to execute instructions (e.g., one or more algorithms) stored on the one or more memories 208. The controller 202 may be a single controller or a plurality of controllers operatively coupled to one another. The controller 202 may be positioned on the agricultural machine 10 or positioned remotely, away from the agricultural machine 10. The controller 202 may be coupled via a wired connection or wirelessly to other components of the agricultural machine 10 and to one or more remote devices. In some instances, the controller 202 may be connected wirelessly via Wi-Fi, Bluetooth, Near Field Communication, or another wireless communication protocol to other components of the agricultural machine 10 and to one or more remote devices.

Referring still to FIG. 3, in the illustrative implementation, the controller 202 is operatively coupled to at least one characteristic sensor 204, the at least one image sensor 210, the sensor 212, the sensor 214, and the sensor 230. In the illustrative implementation, the controller 202 is configured to receive data corresponding to the one or more images of the field of view (e.g. FOV) from the at least one image sensor 210 and data corresponding to the one or more images of the additional fields of view from the image sensors 212, 214. In some implementations, the controller 202 includes or is operatively coupled to a spectrophotometer configured to measure reflectance of material in the field of view (e.g., FOV).

In the illustrative implementation, the controller 202 is operatively coupled to the at least one light emitting device 216 and configured to send one or more signals to the at least one light emitting device 216 causing the at least one light emitting device 216 to emit light into the field of view at a plurality of different ranges of wavelengths, a plurality of different intensities, from different types of light emitters (e.g. Laser, LEDs), or from a different light source location. In some implementations, the controller 202 is operatively coupled to the at least one light filter and configured to send one or more signals to the at least one light filter causing the at least one light filter to filter the light received by the at least one image sensor 210. In some implementations, the light filter is adjusted between ON/OFF modes, and in some implementations, the degree or amount of light being filtered is adjusted. In some implementations, the controller 202 is operatively coupled to the at least one polarizer 218 and configured to send one or more signals to the at least one polarizer 218 causing the at least one polarizer 218 to modify the polarization state of the light received by the at least one image sensor 210.

Referring still to FIG. 3, in some implementations, the controller 202 is operatively coupled to a display, for example, the display 222 of the user interface 220, and configured to send one or more signals to the display based on a determination of an amount of grain shown in one or more images of the field of view. In the illustrative implementation, the controller 202 is operatively coupled to the user interface 220 and configured to receive one or more signals from the user interface 220, which may include inputs for operational characteristics of the agricultural machine 10 (e.g., speed of the agricultural machine 10, direction of the travel of the agricultural machine 10, operational characteristics of the cutting head 18, operational characteristics of the threshing assembly 26, operational characteristics of the clean crop routing assembly 28, operational characteristics of the crop debris routing assembly 60, and operational characteristics of the residue assembly 82. Operational characteristics of the cutting head 18 include cutting head angle along axial span thereof, cutting head height relative to ground, cutting head speed, reel speed, reel position, reel tine angle, corn head deck plate spacing, draper belt speed, cutting head down force, and lateral tilt of cutting head. Operational characteristics of the threshing assembly 26 include threshing rotor speed, position of the thresher basket relative to the threshing rotor, and guide vane orientation. Operational characteristics of the clean crop routing assembly 28 include blower speed and sieve position. Operational characteristics of the crop debris routing assembly 60 include chopper speed and position of the knives relative to the chopper. Operational characteristics of the residue assembly 82 include spreader speed and spreader orientation.

In some implementations, the operational characteristics of the agricultural machine 10 are input by a user via the user interface 220 based on the displayed determination of the amount of grain shown in the one or more images of the field of view. It should be appreciated that in some implementations, the controller 202 is configured to adjust one or more of the operational characteristics of the agricultural machine 10 automatically (e.g., based on a determination of an amount of grain shown in one or more images of the field of view and without instruction from the user interface 220).

In some implementations, the controller 202 is configured to receive one or more signals indicative of one or more environmental characteristics of a worksite in which the harvesting operation is being performed by the agricultural machine 10. In the illustrative implementation, the environmental characteristics comprise one or more wind characteristics (e.g., speed, direction), one or more sunlight characteristics (e.g., amount, intensity, direction, wavelength), one or more plant residue characteristics (e.g., plant residue color, plant residue volume, plant residue arrangement), and one or more soil characteristics (e.g., moisture level, nutrient levels, pH, texture, compaction). As used herein plant residue includes MOG and plant material not intended for harvesting. In some implementations, the controller 202 is configured to receive one or more signals indicative of one or more crop characteristics of a worksite in which the harvesting operation is being performed by the agricultural machine 10. In the illustrative implementation, the crop characteristics comprise crop type (e.g., corn, wheat, soybeans), constituent levels (e.g., moisture levels, protein levels, starch levels, fiber levels, sugar levels, oil levels), standing crop color, standing crop size, down crop values, grain shape, grain size, grain color. In some implementations, the one more environmental characteristics, the one or more crop characteristics, or both may be received via the user interface 220, accessed via private or public data stores associated with the worksite (e.g., Internet-based), accessed from the memory 208, received via at least one characteristic sensor 204, or received via another sensor associated with the agricultural machine 10. In illustrative implementations, the at least one characteristic sensor 204 may be located on or away from the agricultural machine 10, and is configured to measure one or more environmental characteristics associated with the worksite, one or more crop characteristics associated with the worksite, or both.

In some implementations, the agricultural machine 10 is included in a fleet of agricultural machines, which may operate in the same worksite as the agricultural machine 10 or different worksite and at the same time as the agricultural operation performed by the agricultural machine 10 or at another time. In some implementations, the controller 202 is configured to receive an indication of at least one environmental characteristic, at least one crop characteristic, or both from another agricultural machine, which, for example, may be included in the fleet.

In some implementations, for example, to initiate an agricultural operation in a worksite, the controller 202 is configured to cause the at least one light emitting device 216 to emit light into the field of view at a selected range of wavelengths based on at least one environmental characteristic, at least one crop characteristic, or both. In some implementation, the controller 202 is configured to select an expressed value of another light emission variable (e.g., the intensity of light emitted by the at least one light emitting device 216, the filter degree or amount (e.g., polarization state of the light), the type of light emitter of the light emitting device 216 that emits light, and the location of one or more active light sources of the at least one light emitting device 216. In some implementations, the controller 202 is configured to cause the at least one light emitting device 216 to emit light into the field of view at a selected range of wavelengths based on the received indication of at least one environmental characteristic, at least one crop characteristic, or both from the another agricultural machine. In some implementations, the controller 202 is configured to select an expressed value of another light emission variable based on the received indication of at least one environmental characteristic, at least one crop characteristic, or both from the another agricultural machine.

Referring still to FIG. 3, in some implementations, the controller 202 is operatively coupled to at least one cutting head actuator 224, at least one ground engaging mechanism actuator 226, or both. The at least one cutting head actuator 224 and the at least one ground engaging mechanism actuator 226 may each be embodied as at least one of a control valve, a motor, a linear (e.g., cylindrical) actuator, a rotary actuator, or another actuator configured to cause adjustment of an operational characteristic of the agricultural machine 10. As shown in FIG. 3, in some implementations, the controller 202 is operatively coupled to an engine 228 of the agricultural machine and configured send one or more signals to the engine 228 to adjust the speed of the agricultural machine 10. In some implementations, the controller 202 is operatively coupled to one or more additional sub-system actuators 225 (e.g., control valves, motors, linear actuators, rotary actuators), configured to cause adjustment of one or more operational characteristics the threshing assembly 26, the clean crop routing assembly 28, the crop debris routing assembly 60, and the residue assembly 82.

Figure 4:
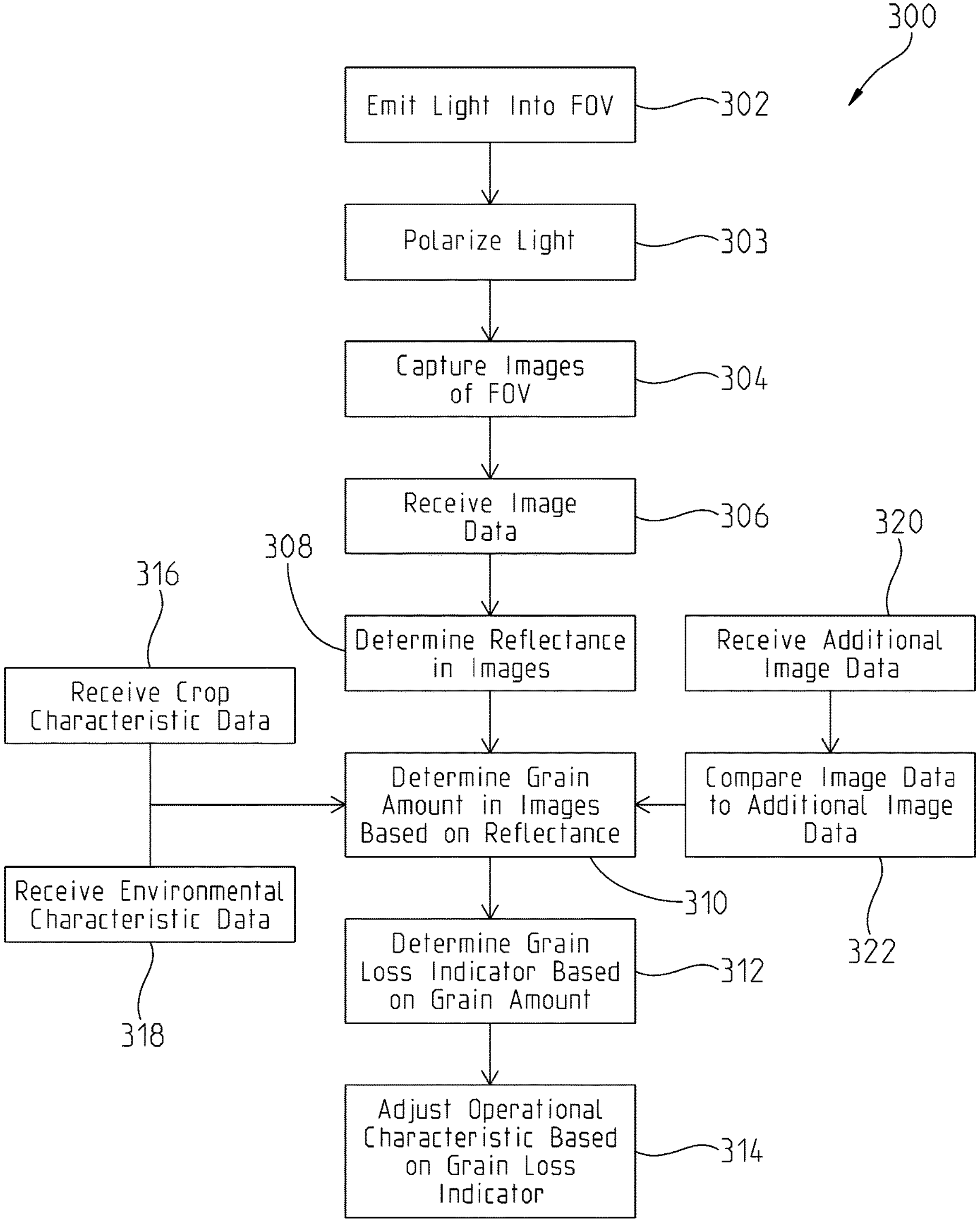
FIG. 4 is a flow diagram showing an example method associated with reducing cutting head harvesting loss of the agricultural machine.

In an example method 300 that is shown in FIG. 4, the control system 200 is usable to determine a grain loss indicator for a portion of a worksite being harvested. In some implementations, the grain loss indicator comprises at least one of a grain loss amount, a grain loss as a percentage of yield, and a monetary value of grain loss.

Referring to FIG. 4, in some implementations, at a block 302, the at least one light emitting device 216 emits light into the field of view (e.g. FOV). In some implementations, at a block 303, at least one light filter filters the light after emission. In some implementations, at least one polarizer 218 filters light into one or more beams of light with adjusted (e.g., increased) polarization. At a block 304, the at least one image sensor 210 captures one or more images of the field of view. In some implementations, the one or more captured images are polarized. At a block 306, the controller 202 receives data corresponding to one or more images of the field of view from the at least one image sensor 210. At a block 308, the controller 202 determines one or more reflectance values based on the received data corresponding to the one or more images. In the illustrative implementation, each reflectance value determined by the controller 202 is associated with a portion of an image of the one or more images of the field of view. At a block 310, the controller 202 determines an amount of grain shown in the one or more images of the field of view based on the one or more determined reflectance values. In some implementations, at a block 312, the controller 202 determines the grain loss indicator (e.g., grain loss amount, grain loss as a percentage of yield, and monetary value of grain loss) for a portion of a worksite being harvested based on the amount of grain shown in the one or more images of the field of view, the area of the portion of the worksite being harvested, and the area of the field of view. In some implementations, at a block 314, the controller 202 causes adjustment of one or more operational characteristics of the agricultural machine 10 based on the grain loss indicator. For example, the controller 202 sends one or more signals to at least one of the at least one cutting head actuator 224, the at least one ground engaging mechanism actuator 226, and the engine 228 to cause adjustment of an associated operational characteristic. For example, in some implementations, the controller 202 compares the grain loss indicator to a threshold value for grain loss (which may be established, e.g., in part, based on one or more environmental characteristics associated with the worksite, one or more crop characteristics associated with the worksite, or both), and the controller 202 sends the one or more signals to at least one of the at least one cutting head actuator 224, the at least one ground engaging mechanism actuator 226, and the engine 228 if the grain loss indicator exceeds the threshold value for grain loss.

In some implementations, the controller 202 is configured to determine the area of the portion of the worksite being harvested (e.g., based on lateral length of cutting head from first end 21 to second end 23 and at least one of: (i) distance traveled by agricultural machine 10 while harvesting the portion of the worksite and (ii) speed of agricultural machine 10 and time elapsed while harvesting the portion of the worksite). In some implementations, the controller 202 is configured to determine the area of the field of view (e.g., based on information accessed from memory 202, received via user interface 220, or received via the at least one image sensor 210). In some implementations, the controller 202 is configured to determine the grain loss amount based on the amount of grain shown in the one or more images of the field of view, the area of the portion of the worksite being harvested, and the area of the field of view.

In some implementations, the controller 202 is configured to obtain a yield value (e.g., bushels per acre) for the portion of the worksite being harvested (e.g., based on one or more signals received from the yield sensor 230). In some implementations, the controller 202 is configured to determine the grain loss as a percentage of yield based on the grain loss amount for the portion of the worksite being harvested and the yield value for the portion of the worksite being harvested.

In some implementations, the controller 202 is configured to obtain a market value of grain (e.g., dollars per bushels) of the crop type being harvested. In some implementations, the controller 202 is configured to determine the monetary value of grain loss based on the grain loss amount for the portion of the worksite being harvested and the market value of grain.

In some implementations, at a block 316, the controller 202 receives one or more signals indicative of one or more crop characteristics associated with the worksite. In some implementations, the controller 202 determines the amount of grain shown in the one or more images of the field of view further based on one or more received crop characteristics associated with the worksite. In some implementations, at a block 318, the controller 202 receives one or more signals indicative of one or more environmental characteristics associated with the worksite. In some implementations, the controller 202 determines the amount of grain shown in the one or more images of the field of view further based on one or more received environmental characteristics associated with the worksite. For example, based on the environmental characteristics and crop characteristics, the appearance of grain in the one or more images of the field of view (and the corresponding data associated therewith) may differ such that evaluating the environmental characteristics and crop characteristics is advantageous for accurately determining the amount of grain shown in the one or more images of the field of view. For example, a change in sunlight amount may cause grain to appear a slightly different color.

In some implementations, the controller 202 determines the amount of grain shown in the one or more images of the field of view based on one or more relationships between reflectance values and grain. For example, in some implementations, the controller 202 compares the determined reflectance value to predetermined reflectance values of one or more grain types (e.g., stored in the memory 208) to determine whether the determined reflectance value indicates the presence of grain in the one or more images of the field of view. Crop characteristics and environmental characteristics affect the relationship between the reflectance values and the grain. For example, the predetermined reflectance values of the one or more grain types may differ based on the presence, absence, or degree of one or more crop characteristics, one or more environmental characteristics, or both. For example, a change in sunlight amount may cause grain to have a different reflectance value.

In some implementations, the control system 200 leverages machine learning to more accurately determine the amount of grain shown in the one or more images of the field of view. For example, the controller 202 may rely on data from other harvesting operations, other agricultural machines, or other worksites (e.g., where the same crop type is harvested) to arrive at predetermined reflectance values of grain. Thus, as shown in FIG. 4, at a block 320, the controller 202 is configured to compare the data corresponding to the one or more captured images to data corresponding to one or more additional images including grain of a crop type associated with the worksite, and at a step 322, the controller 202 is configured to determine the amount of grain shown in the one or more images of the field of view further based on comparison between the data corresponding to the one or more captured images and the data corresponding to the one or more additional images.

Figure 5:
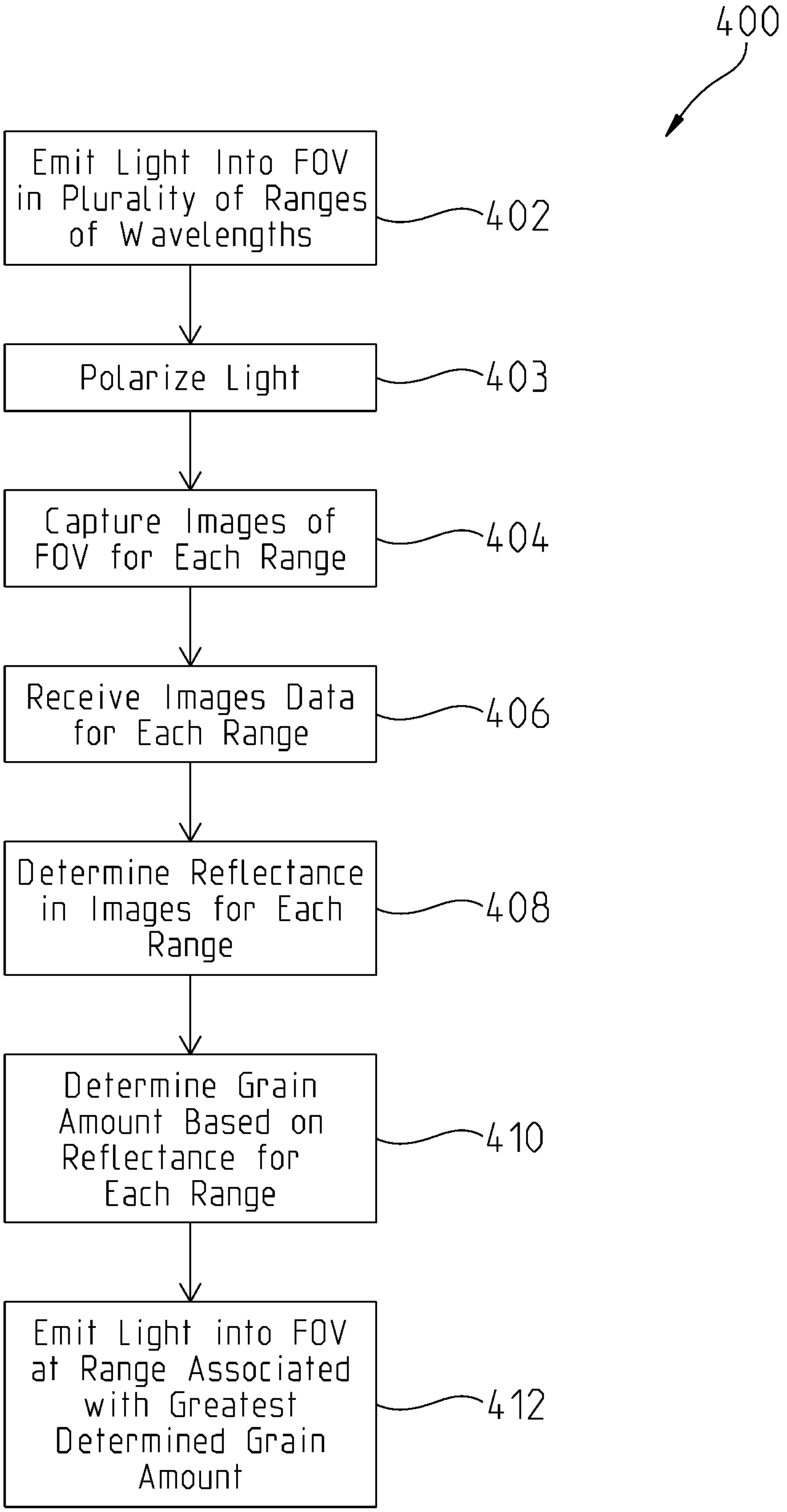
FIG. 5 is a flow diagram showing an example calibration method, for an exemplary light emission variable, the calibration method being associated with reducing cutting head harvesting loss of the agricultural machine.

Referring now to FIG. 5, in an example method 400, the control system 200 is usable to perform a calibration operation as to the range of wavelengths of light. And subsequently, the controller 202 determines the grain loss indicator for the portion of the worksite being harvested at the calibrated range of wavelengths of light. For example, at a block 402, the controller 202 sends one or more signals to the at least one light emitting device 216 causing the at least one light emitting device 216 to emit light into the field of view in a plurality of ranges of wavelengths. In some implementations, at a block 403, at least one light filter filters the light after emission. In some implementations, light from the field of view may be polarized by the at least one polarizer 218. At a block 404, the at least one image sensor 210 captures one or more images of the field of view for each range of wavelengths. In some implementations, the one or more captured images are polarized. At a block 406, the controller 202 receives data corresponding to one or more images of the field of view from the at least one image sensor 210 for each range of wavelengths. At a block 408, the controller 202 determines, for each range, one or more reflectance values based on the received data corresponding to the one or more images. In the illustrative implementation, each reflectance value is associated with a portion of an image of the one or more images. At a block 410, the controller 202 determines, for each range, an amount of grain shown in the one or more images of the field of view based on the one or more determined reflectance values. At a block 412, the controller 202 causes the at least one light emitting device 216 to emit light into the field of view in the range of wavelengths associated with the greatest amount of grain determined, by the controller 202, to be shown in the one or more images.

It should be appreciated that, in the method 400, in some implementations, the controller 202 receives one or more crop characteristics and one or more environmental characteristics and determines, for each range of wavelengths, the amount of grain shown in the one or more images of the field of view further based on the one or more received crop characteristic and one or more environmental characteristics. It should also be appreciated that, in the method 400, in some implementations, the controller 202 leverages machine learning, as described in blocks 320, 322, to more accurately determine, for each range of wavelengths, the amount of grain shown in the one or more images of the field of view. Subsequent to execution of the calibration method 400, the control system 200 executes blocks associated with the method 300 using the range of wavelengths determined via the calibration method 400.

The range of wavelengths emitted by the at least one light emitting device 216 is an example of a light emission variable. Other light emission variables includes: the intensity of light emitted by the at least one light emitting device 216, the filter amount or degree (e.g., polarization state of the light, which, in some implementations is adjustable by the at least one polarizer 218), the type of light emitter of the light emitting device 216 (e.g., LEDs, Laser, or both) that emits light, and the location of one or more active light sources of the at least one light emitting device 216. The method 400 is one example of calibrating a light emission variable. In some implementations, in addition to calibrating the range of wavelengths of light, the control system 200 (in an example method 500) is useable to calibrate other light emission variables.

Figure 6:
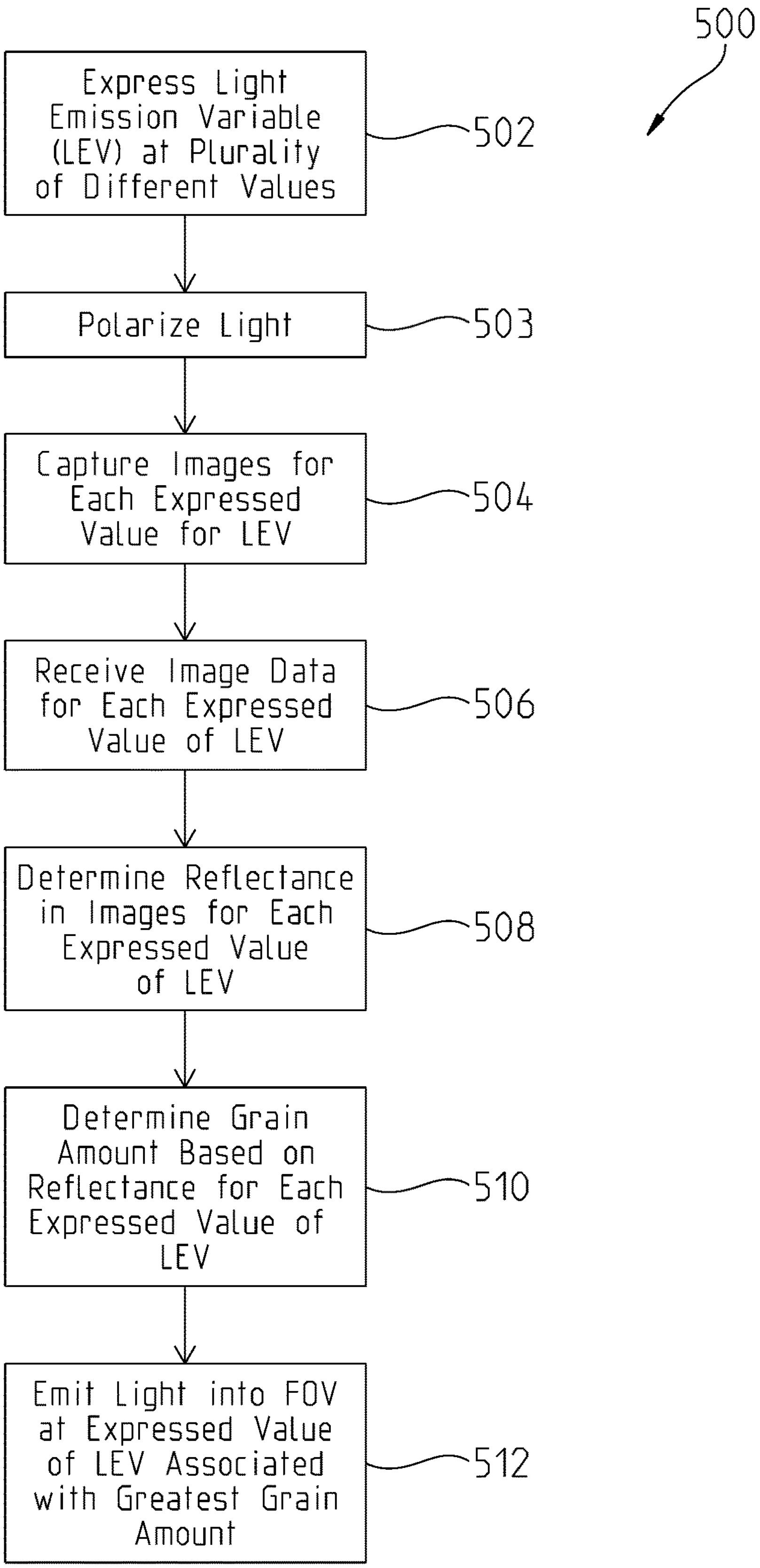
FIG. 6 is a flow diagram showing an example calibration method, applicable to a plurality of light emission variables, the calibration method being associated with reducing cutting head harvesting loss of the agricultural machine.

For example, as shown in FIG. 6, for each light emission variable, at a block 502, the controller 202 sends one or more signals to the at least one light emitting device 216 (or the at least one light filter, e.g., the at least one polarizer 218 in the case of the polarization state of the light) to cause the light emission variable to be expressed at a plurality of different values (e.g., different intensities, filter amount or degree (e.g., different polarization states), different types of light emitters, different location of light source). In some implementations, at a block 503, at least one light filter filters the light after emission. In some implementations, light from the field of view may be polarized by the at least one polarizer 218. At a block 504, the at least one image sensor 210 captures one or more images of the field of view for each expressed value of the light emission variable. In some implementations, the one or more captured images are polarized. At a block 506, the controller 202 receives data corresponding to one or more images of the field of view from the at least one image sensor 210 for each expressed value of the light emission variable. At a block 508, the controller 202 determines, for each expressed value of the light emission variable, one or more reflectance values based on the received data corresponding to the one or more images. At a block 510, the controller 202 determines, for each expressed value of the light emission variable, an amount of grain shown in the one or more images of the field of view based on the one or more determined reflectance values. At a block 512, the controller 202 causes the at least one light emitting device 216 (or the at least one light filter, e.g., the at least one polarizer 218 in the case of the polarization state of the light) to express the light emission variable at the expressed value associated with the greatest amount of grain determined, by the controller 202, to be shown in the one or more images.

It should be appreciated that, in the method 500, in some implementations, the controller 202 receives one or more crop characteristics and one or more environmental characteristics and determines, for each expressed value of the light emission variable, the amount of grain shown in the one or more images of the field of view further based on the one or more received crop characteristic and one or more environmental characteristics. It should also be appreciated that, in the method 500, in some implementations, the controller 202 leverages machine learning, as described in blocks 320, 322, to more accurately determine, for each expressed value of the light emission variable, the amount of grain shown in the one or more images of the field of view. Subsequent to execution of the calibration method 500, the control system 200 executes blocks associated with the method 300 using the expressed value of the light emission variable determined via the calibration method 500.

In some implementations, the controller 202 is configured to receive one or more signals from the user interface 220 indicative of a selected value for one or more of the light emission variables. In such implementations, the controller 202 is configured to cause the at least one light emitting device 216 or the at least one light filter (e.g., the at least one polarizer 218) to express the corresponding one or more light emission variables at the selected value. It should be appreciated that, in some implementations, the control system 200 executes blocks associated with the method 300 using the selected value for the one or more light emission variables.

In some implementations, the controller 202 is configured to determine a desired range of wavelengths from the plurality of ranges of wavelengths based on at least one environmental characteristic, at least one crop characteristic, or both. In some implementations, the desired range of wavelengths is the range of wavelengths that, when emitted, results in the greatest amount of grain being visible (e.g., by an operator) or determined (e.g., by the controller 202) to be shown in the one or more images of the field of view; in some implementations, the desired range of wavelengths is the range of wavelengths that, when emitted, results in the most accurate amount of grain being determined (e.g., by the controller 202) to be shown in the one or more images of the field of view; in some implementations, the desired range of wavelengths is based on both the greatest amount of grain determined (e.g., by the controller 202) to be shown and the most accurate amount of grain determined to be shown in the one or more images of the field of view. For example, the controller 202 may determine the desired range of wavelengths based: (1) receipt of at least one environmental characteristic, at least one crop characteristic, or both, and (2) data (e.g., stored on in memory 208) representing a relationship between: (i) the at least one environmental characteristic, the at least one crop characteristic, or both, (ii) the plurality of ranges of wavelengths, and (iii) the amount of grain determined to be shown in the one or more images of the field of view. In such implementations, the controller 202 is configured to cause the at least one light emitting device 216 to emit light into the field of view at the desired range of wavelengths.

It should be appreciated that, in some implementations, the controller 202 is configured to determine a desired value for each light emission variable based on at least one environmental characteristic, at least one crop characteristic, or both. In some implementations, the desired value for each light emission is the value that, when expressed, results in the greatest amount of grain being visible (e.g., by an operator) or determined (e.g., by the controller 202) to be shown in the one or more images of the field of view; in some implementations, the desired value for each light emission variable is the value that, when expressed, results in the most accurate amount of grain being determined (e.g., by the controller 202) to be shown in the one or more images of the field of view; in some implementations, the desired value for each light emission variable is based on both the greatest amount of grain determined (e.g., by the controller 202) to be shown and the most accurate amount of grain determined to be shown in the one or more images of the field of view. For example, the controller 202 may determine the desired value for each light emission variable based: (1) receipt of at least one environmental characteristic, at least one crop characteristic, or both, and (2) data (e.g., stored on in memory 208) representing a relationship between: (i) the least one environmental characteristic, the at least one crop characteristic, or both, (ii) the expressed values of the light emission variables, and (iii) the amount of grain determined to be shown in the one or more images of the field of view. In such implementations, the controller 202 is configured to cause the at least one light emitting device 216 to emit light into the field of view at the desired range of wavelengths.

Figure 7:
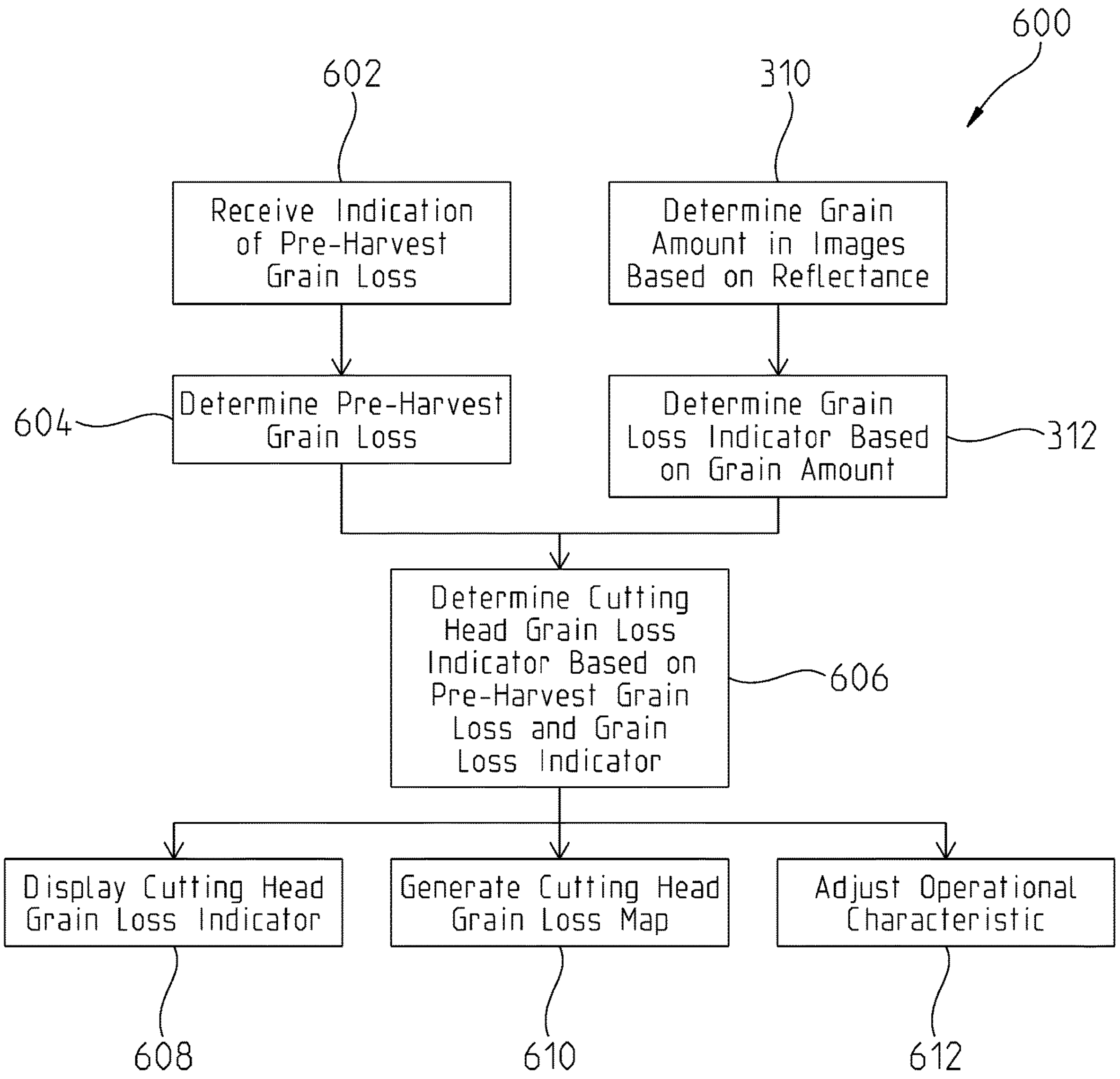
FIG. 7 is a flow diagram showing another example method associated with reducing cutting head harvesting loss of the agricultural machine.

Referring now to FIG. 7, in an example method 600, the control system 200 is usable to determine grain loss occurring during the harvesting operation, which is exclusive of pre-harvest grain loss. At a block 602, the controller 202 receives an indication of pre-harvest grain loss (e.g., via the sensor 214, via the user interface 220, via private or public data stores (e.g., Internet-based) associated with the worksite). At a block 604, the controller 202 determines the pre-harvest grain loss for the portion of the worksite being harvested. As described with reference to example method 300, at block 312, (based on the grain amount determined at the block 310), the controller 202 determines the grain loss indicator for the portion of the worksite being harvested. In the illustrative implementation, at a block 606, the controller 202 determines the cutting head grain loss indicator based on the determined pre-harvest grain loss for the portion of the worksite being harvested and the determined grain loss indicator for the portion of the worksite being harvested. Similar to the grain loss indicator, in some implementations, the cutting head grain loss indicator is expressed as a grain loss amount during harvesting, grain loss during harvesting as a percentage of yield, and a monetary value of grain loss during harvesting. It should be appreciated that the cutting head grain loss indicator is associated with the grain loss resulting from operation of the cutting head 18.

In some implementations, at a block 608, the controller 202 sends one or more signals to a display operatively coupled to the controller 202 (e.g., display 222) causing the cutting head grain loss indicator to be displayed. In some implementations, at a block 610, the controller 202 generates a cutting head grain loss map, which indicates one or more cutting head grain loss indicators at one or more corresponding locations in the worksite. For example, the one or more cutting head grain loss indicators may be color-coded based on degree of grain loss at corresponding locations of the worksite. In some implementations, the controller 202 causes the cutting head grain loss map to be a displayed on a display operatively coupled to the controller 202 (e.g., display 222). In some implementations, at a block 612, the controller 202 causes adjustment of one or more operational characteristics of the agricultural machine 10 based on the cutting head grain loss indicator. For example, the controller 202 sends one or more signals to at least one of the at least one cutting head actuator 224, the at least one ground engaging mechanism actuator 226, and the engine 228 to cause adjustment of associated operational characteristic. For example, in some implementations, the controller 202 compares the cutting head grain loss indicator to a threshold value for cutting head grain loss (which may be established, e.g., based on one or more environmental characteristics associated with the worksite, one or more crop characteristics associated with the worksite, or both), and the controller 202 sends the one or more signals to at least one of the at least one cutting head actuator 224, the at least one ground engaging mechanism actuator 226, and the engine 228 if the cutting head grain loss indicator exceeds the threshold value for cutting head grain loss.

While the disclosure has been illustrated and described in detail in the drawings and foregoing description, such illustration and description is to be considered as exemplary and not restrictive in character, it being understood that illustrative implementation(s) have been shown and described and that all changes and modifications that come within the spirit of the disclosure are desired to be protected. It will be noted that alternative implementations of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. An agricultural machine for reducing cutting head harvesting loss comprising:
- ground engaging mechanisms configured to support a chassis and rotate during movement of the agricultural machine;
- a cutting head positioned forward of the ground engaging mechanisms and configured to harvest crop in a worksite;
- at least one image sensor configured to capture one or more images of a field of view, the field of view being external to the agricultural machine;
- at least one light emitting device configured to emit light into the field of view;
- a controller configured to:
  - receive data corresponding to one or more images of the field of view from the at least one image sensor;
  - determine one or more reflectance values based on the received data corresponding to the one or more images, each reflectance value being associated with a portion of an image of the one or more images; and
  - determine an amount of grain shown in the one or more images of the field of view based on the one or more determined reflectance values;
- wherein the controller is configured to compare the data corresponding to the one or more captured images to data corresponding to one or more additional images including grain of a crop type associated with the worksite; and
- wherein the controller is configured to determine the amount of grain shown in the one or more images of the field of view further based on comparison between the data corresponding to the one or more captured images and the data corresponding to the one or more additional images.

2. The agricultural machine of claim 1, wherein the at least one light emitting device is configured to emit light from a plurality of locations in the field of view.

3. The agricultural machine of claim 1, wherein the at least one light emitting device is configured to emit light into the field of view in a plurality of ranges of wavelengths of visible light; and
- wherein each range of wavelengths of visible light of the plurality of ranges of wavelengths of visible light is associated with a specific color of visible light.

4. The agricultural machine of claim 1, wherein the controller is configured to cause the at least one light emitting device to emit light into the field of view in a plurality of ranges of wavelengths.

5. The agricultural machine of claim 4, wherein the controller is configured to:
- receive data corresponding to one or more images of the field of view from the at least one image sensor for each range of wavelengths of the plurality of ranges of wavelengths;

determine, for each range of the plurality of ranges of wavelengths, one or more reflectance values based on the received data corresponding to the one or more images, each reflectance value being associated with a portion of an image of the one or more images; and determine, for each range, an amount of grain shown in the one or more images of the field of view based on the one or more determined reflectance values.

6. The agricultural machine of claim 5, wherein the controller causes the at least one light emitting device to emit light into the field of view in the range of wavelengths associated with the greatest amount of grain determined, by the controller, to be shown in the one or more images.

7. The agricultural machine of claim 6, wherein the controller is configured to compare the data corresponding to the one or more captured images to data corresponding to one or more additional images including grain of a crop type associated with the worksite; and wherein the controller is configured to determine the amount of grain shown in the one or more images of the field of view further based on comparison between the data corresponding to the one or more captured images and the data corresponding to the one or more additional images.

8. The agricultural machine of claim 1, wherein the controller is configured to cause adjustment of an operational characteristic of the agricultural machine based on the amount of grain determined to be shown in the one or more images of the field of view.

9. The agricultural machine of claim 1, wherein the controller is configured to:

receive an indication of a pre-harvest grain loss; and generate a cutting head harvesting loss map, which indicates grain loss that has occurred during the harvesting operation and one or more corresponding locations in the worksite where the grain loss has occurred during the harvesting operation, based on the indication of pre-harvest grain loss and based on the amount of grain determined to be shown in the one or more images of the field of view.

10. The agricultural machine of claim 1, wherein the controller is configured to cause the at least one light emitting device to emit light into the field of view at a plurality of intensities.

11. The agricultural machine of claim 1, further comprising at least one light filter configured to filter the emitted light captured by the at least one image sensor.

12. An agricultural machine for reducing cutting head harvesting loss comprising:

ground engaging mechanisms configured to support a chassis and rotate during movement of the agricultural machine;

a cutting head positioned forward of the ground engaging mechanisms and configured to harvest crop in a worksite;

at least one image sensor configured to capture one or more images of a field of view, the field of view being external to the agricultural machine;

at least one light emitting device configured to emit light into the field of view;

a controller configured to:

receive data corresponding to one or more images of the field of view from the at least one image sensor;

determine one or more reflectance values based on the received data corresponding to the one or more images, each reflectance value being associated with a portion of an image of the one or more images; and determine an amount of grain shown in the one or more images of the field of view based on the one or more determined reflectance values;

wherein the controller is configured to cause the at least one light emitting device to emit light into the field of view in a plurality of ranges of wavelengths;

wherein the controller is configured to determine a desired range of wavelengths from the plurality of ranges of wavelengths based on at least one of:

(i) at least one of the following environmental characteristics of the worksite: a wind characteristic, a sunlight characteristic, a plant residue characteristic, and a soil characteristic, and (ii) at least one crop characteristic of the crop in the worksite; and wherein the controller is configured to cause the at least one light emitting device to emit light into the field of view at the desired range of wavelengths.

13. The agricultural machine of claim 12, wherein the controller is configured to determine a desired range of wavelengths from the plurality of ranges of wavelengths based on at least one crop characteristic of the crop in the worksite.

14. An agricultural machine for reducing cutting head harvesting loss comprising:

ground engaging mechanisms configured to support a chassis and rotate during movement of the agricultural machine;

a cutting head positioned forward of the ground engaging mechanisms and configured to harvest crop in a worksite;

at least one image sensor configured to capture one or more images of a field of view, the field of view being external to the agricultural machine;

at least one light emitting device configured to emit light into the field of view;

a controller configured to:

receive data corresponding to one or more images of the field of view from the at least one image sensor;

determine one or more reflectance values based on the received data corresponding to the one or more images, each reflectance value being associated with a portion of an image of the one or more images; and determine an amount of grain shown in the one or more images of the field of view based on the one or more determined reflectance values;

wherein the controller is configured to:

receive an indication of a pre-harvest grain loss; and cause an indication of grain loss associated with the cutting head to be displayed based on the indication of pre-harvest grain loss and based on the amount of grain determined to be shown in the one or more images of the field of view.

15. The agricultural machine of claim 14, wherein the controller is configured to compare the data corresponding to the one or more captured images to data corresponding to one or more additional images including grain of a crop type associated with the worksite; and wherein the controller is configured to determine the amount of grain shown in the one or more images of the field of view further based on comparison between the data corresponding to the one or more captured images and the data corresponding to the one or more additional images.

16. A method for reducing cutting head harvesting loss of an agricultural machine configured to harvest crop in a worksite, the method comprising:

capturing one or more images of a field of view that is external to the agricultural machine;

emitting light in the field of view with at least one light emitting device;

receiving, via a controller, data corresponding to one or more images of the field of view;

determining, via the controller, one or more reflectance values based on the received data corresponding to the one or more images, each reflectance value being associated with a portion of an image of the one or more images;

determining, via the controller, an amount of grain shown in the one or more images of the field of view based on the one or more determined reflectance values;

comparing, via the controller, the data corresponding to the one or more captured images to data corresponding to one or more additional images including grain of a crop type associated with the worksite; and determining, via the controller, the amount of grain shown in the one or more images of the field of view further based on comparison between the data corresponding to the one or more captured images and the data corresponding to the one or more additional images.

17. A method for reducing cutting head harvesting loss of an agricultural machine configured to harvest crop in a worksite, the method comprising:

capturing one or more images of a field of view that is external to the agricultural machine;

emitting light in the field of view with at least one light emitting device in a first range of wavelengths and a second range of wavelengths;

receiving, via a controller, data corresponding to one or more images of the field of view from the at least one image sensor for the first range of wavelengths and the second range of wavelengths;

determining, via the controller, for each of the first and second ranges of wavelengths, one or more reflectance values based on the received data corresponding to the one or more images, each reflectance value being associated with a portion of an image of the one or more images;

determining, via the controller, for each of the first and second ranges of wavelengths, an amount of grain shown in the one or more images of the field of view based on the one or more determined reflectance values; and emitting light into the field of view in the first or second range of wavelengths based on which of the first or second range of wavelengths is associated with the greatest amount of grain determined, by the controller, to be shown in the one or more images.

18. The method of claim 17, further comprising:

comparing, via the controller, the data corresponding to the one or more captured images to data corresponding to one or more additional images including grain of a crop type associated with the worksite; and determining, via the controller, the amount of grain shown in the one or more images of the field of view further based on comparison between the data corresponding to the one or more captured images and the data corresponding to the one or more additional images.

* * * * *